United States Patent

[11] 3,599,759

| | | |
|---|---|---|
| [72] | Inventor | Robert R. Hager<br>South Bend, Ind. |
| [21] | Appl. No. | 837,525 |
| [22] | Filed | June 30, 1969 |
| [45] | Patented | Aug. 17, 1971 |
| [73] | Assignee | The Bendix Corporation |

[54] SIMPLIFIED ADJUSTING MEANS FOR WEDGE BRAKES
3 Claims, 6 Drawing Figs.

[52] U.S. Cl............................................... 188/79.5 GE, 188/196 RR
[51] Int. Cl............................................... F16d 65/56, F16d 51/52
[50] Field of Search................................. 188/79.5 P, 79.5 GE, 196 F, 196 FR, 196 RR

[56] References Cited
UNITED STATES PATENTS

| | | | |
|---|---|---|---|
| 2,196,799 | 4/1940 | Keplinger........................ | 188/79.5 GE |
| 3,232,392 | 2/1966 | Mossey........................... | 188/79.5 GE X |

*Primary Examiner*—Duane A. Reger
*Attorneys*—C. F. Arens and Plante, Arens, Hartz, Hix and Smith ABSTRACT: An adjuster mechanism for wedge brakes includes a plunger assembly that carries an adjuster nut coaxially receiving an adjuster screw. The adjuster nut includes a flange having ratchet teeth thereon that engage an upturned pawl integral with a circular spring that is mounted in the housing coaxially with the plunger assembly. The pawl follows the axial movement of the plunger to rotate the adjuster nut to extend the screw from the nut, thereby effecting adjustment of the brakes. However, when "kickback" forces (hereinafter defined) lock the nut and screw against relative rotation, the spring deforms in a radial direction to prevent destruction of the brake. Upon release of the "kickback" forces, the spring releases its radial deformation, rotating the adjuster nut in the normal manner.

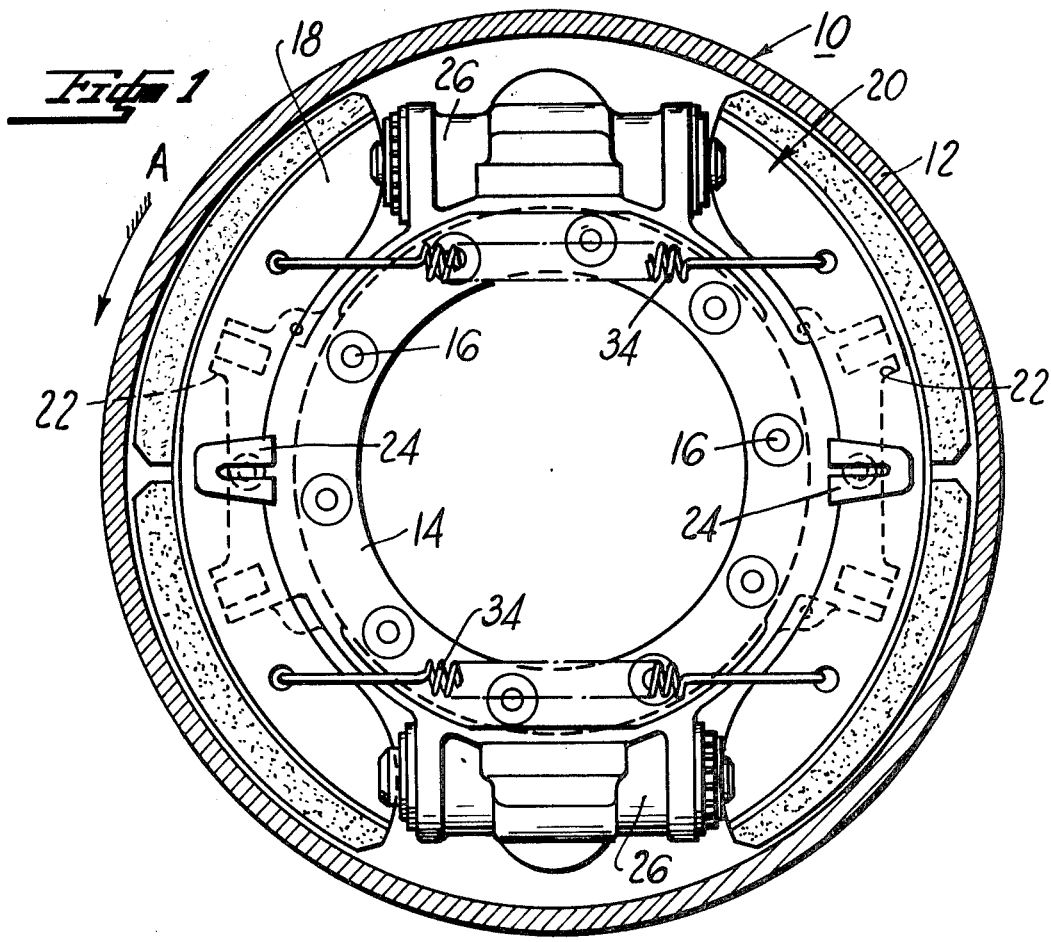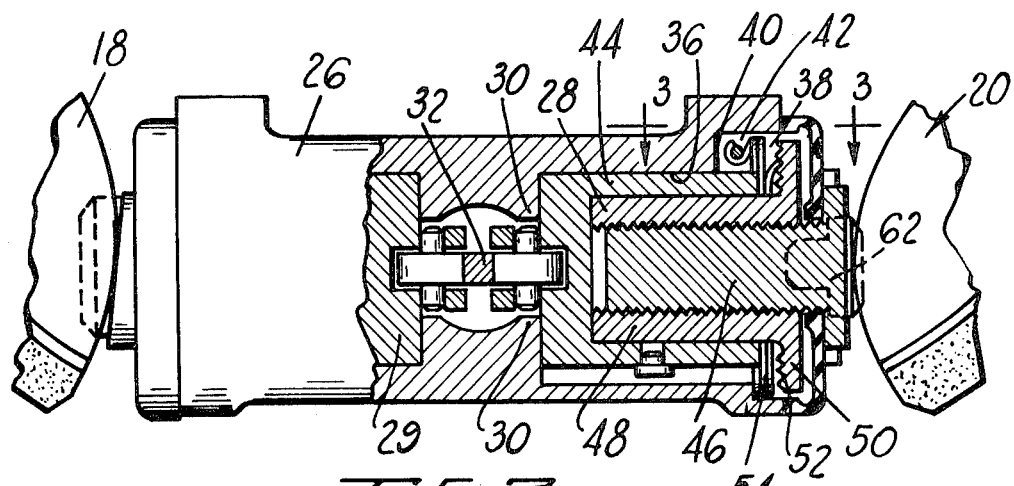

PATENTED AUG 17 1971

INVENTOR.
ROBERT R. HAGER
BY
Plante, Arens, Hartz, Hix, and Smith
ATTORNEYS

SIMPLIFIED ADJUSTING MEANS FOR WEDGE BRAKES

BACKGROUND OF THE INVENTION

This invention relates to an adjuster mechanism for wedge-actuated drum brakes.

Adjusting mechanisms that move brakeshoes closer to a rotatable drum to compensate for lining wear have been known for many years. An example of this type of brakeshoe adjuster is shown in U.S. Pat. No. 3,246,723, owned by the assignee of the present invention. Although the adjusting mechanism design disclosed in the above-mentioned patent is now in commercial production and has been quite successful, the instant invention substantially reduces the number of parts required in the assembly, thereby substantially reducing manufacturing costs, resulting in an efficient and uncomplicated mechanism.

Briefly, U.S. Pat. No. 3,246,723 teaches a wedge brake adjuster having an adjuster nut concentric with an adjuster screw. A flange having a plurality of downwardly extending teeth is mounted on the adjuster nut and is engaged by a spring-loaded pawl to incrementally rotate the nut to extend the latter from the screw, thus moving the brakeshoes closer to the drum. Since under certain conditions relative rotation between the screw and the nut is precluded when the shoes are moved to their released positions due to so-called "kickback" forces, it is necessary to compensate for this condition. Therefore, in the prior art device, a resilient member was interposed between the flange and the adjuster nut to absorb these "kickback" forces.

SUMMARY OF THE INVENTION

Therefore, it is an important object of my invention to provide an adjuster mechanism having a flange integral with the adjuster nut thereof.

Another important object of my invention is to provide an adjuster mechanism that eliminates the resilient member formally interposed between the flange and the adjuster nut, combining its function with the drive means or pawl found in prior art devices into a single member.

Another important object of my invention is to provide an adjuster mechanism having a pawl and ratchet mechanism that does not require a separate spring to maintain the pawl in engagement with the ratchet.

Yet another important object of my invention is to provide an overload spring mechanism that is capable of absorbing much greater torques than existing devices.

DESCRIPTION OF THE DRAWINGS

FIG. 1 is a front elevational view of the brake assembly;

FIG. 2 is a cross-sectional view of the actuator and adjusting mechanism of the brake assembly of FIG. 1, which are illustrated in the shoe-retracted position;

DETAILED DESCRIPTION

Figure 3:
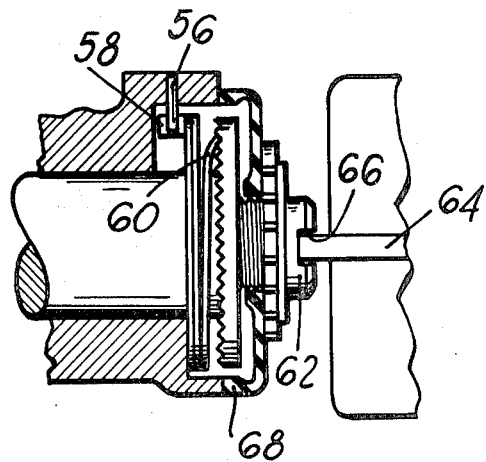
FIG. 3 is a cross-sectional view taken along lines 3-3 of FIG. 2.
Figure 4:
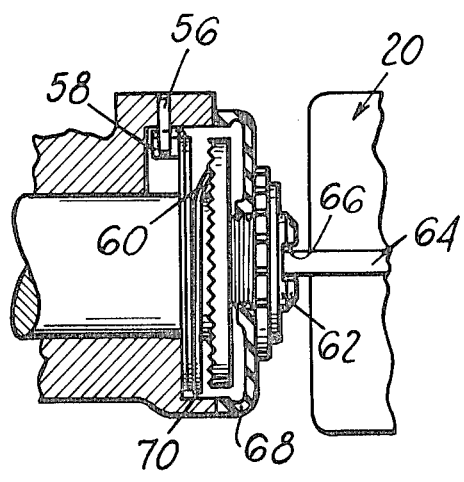
FIG. 4 is a cross-sectional view similar to FIG. 3, but illustrating the position of the overload spring when the nut and adjuster screw are locked against rotation.
Figure 5:
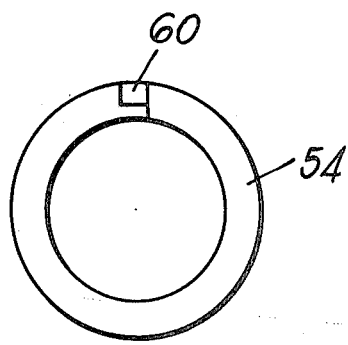
FIG. 5 is a top plan view of the overload spring used in the instant invention.
Figure 6:
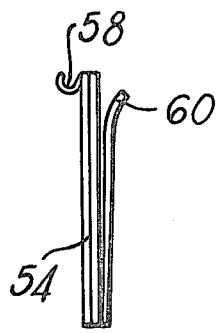
FIG. 6 is a side elevation of the overload spring of FIG. 5.

Referring now to the drawings, brake assembly 10 includes a drum 12 mounted for rotation with a wheel (not shown) to be braked. A torque spider 14 is adapted to be mounted on a stationary part of a vehicle, such as an axle flange, by inserting bolts (not shown) through the circumferentially spaced openings 16. A pair of brakeshoes 18 and 20 respectively, are yieldably biased toward supporting ledges 22 via a pair of holddown springs 24. Torque spider 14 further includes a pair of diametrically opposed cylinder housings 26 formed integrally therewith, each of which contains a slidable plunger assembly 28 and a plunger 29. A pair of anchor flanges 30 is located within each cylinder housing. The plunger assembly 28 and plunger 2 each abut the anchor flanges 30 when the brake is released and one of the plunger assemblies or plungers anchors on the anchor flanges 30 during braking application depending upon drum rotation. The plunger assembly 28 and plunger 29 are spread apart by a wedge member 32 which may be of any well-known arrangement such as illustrated in U.S. Pat. No. 2,527,126 issued to Goepfrich. A pair of shoe return springs 34 returns the shoes and thereby the plungers to the released position.

Each housing 26 defines a bore 36 therewithin having an initially open end 38. Bore 36 is stepped as at 40 to present a recess 42 facing toward the open end 38. Plunger assembly 28 slides in the bore 36 and includes a plunger housing 44, a first member or adjuster screw 46 and a second member or adjuster nut 48 that threadedly engages the adjuster screw 46. Adjuster nut 48 includes a flange 50 having a set of inwardly projecting ratchet teeth 52.

A circular spring 54 is mounted in the recess 42 concentric with the coaxial members 46 and 48. A pin 56 extends through the housing 26 and engages an eyelet 58 formed integral with the spring 54. Spring 54 consists of a length of flat wire formed into a coil and has an upturned portion 60 that engages the ratchet teeth 52 to provide a pawllike drive means for the nut 48. The flat wire spring 54 is adapted to absorb force acting along the axes of the plunger assembly 28 or rotational energy due to relative rotation between the nut 48 and the housing 26.

The adjuster screw 46 receives a slotted connecting device 62 which engages a portion 64 of the brakeshoe 18 in the slot 66 thereof. A resilient boot 68 interconnects the housing 26 and the adjuster screw 46 to prevent contaminants from entering the bore 36.

MODE OF OPERATION

In operation, assuming rotation of the drum and the direction of the arrow A, actuation of the wedge 32 will spread the plunger assembly 28 and the plunger 29 apart with the shoes 28 and 20 anchoring on the flanges 30 through the plunger 29. Spring 54 is under axial compression with the brakes in the released position and therefore the pawl 60 follows the axial movement of the plunger assembly 28. If the plunger assembly 28 has moved a predetermined distance in the brake actuating direction, the pawl 60 will pick up a new tooth on the flange 50 and upon release of the actuating pressure on the wedge, the return springs 34 will return the plunger assembly 28 to its normally released position against the anchoring flange 30. During the return stroke of the plunger assembly 28 to its released position, the pawl 60 will exert a clockwise rotational force on the flange 50, thereby extending the adjuster screw 46 in an axial direction a given amount effecting adjustment of the brake.

However, there is a condition known as "kickback" wherein the brakeshoe is thrust in a direction toward the brake release position during brake application. When "kickback" occurs, the axial force exerted by the shoe is so great that the nut 48 and screw 46 are locked against relative rotation. When this condition exists, the spring 54 will yield radially as at 70 to absorb the "kickback" force. Upon release of the "kickback" force, the spring 54 relaxes radially to permit the pawl 60 to rotate the flange 50 in the normal manner. Since the spring 54 has a much greater spring constant for deformation in the radial direction than in the axial direction, under normal brake applications, when no "kickback" forces are present, the spring will not deform radially, thus permitting normal operation of the adjuster pawl 60 and flange 50. When the brake is in the released position, engagement of the pawl 60 with the appropriate tooth 52 prevents counterclockwise rotation of the adjuster nut 48, the spring constant for deformation of the spring 54 in a radial direction being large enough so that normal forces acting on the brake will not disturb the pawl.

Thus, it can be seen that the present invention simplifies the construction of adjuster mechanisms for wedge brakes, therefore substantially reducing their manufacturing costs. A single spring member replaces the pawl, the pawl spring, and the overload spring necessary on former devices. The flange 50 and nut 48 may be a single member instead of a pair of members interconnected by the overload spring as in previous designs. This feature not only simplifies assembly, but also is a much stronger structural unit and therefore eliminates many field service problems.

I claim:

1. In a brake having a pair of shoes engageable with a rotatable drum:

a housing defining a bore therewithin having an open end;

a plunger assembly slidable in said bore for movement relative to the housing in a brake-applying direction and in a return direction;

said plunger assembly including a first member held against rotation by one of said shoes and a second member threadedly engaging said first member and rotatable relative thereto; and resilient means carried by the housing including drive means engageable with said second member to impart a rotational force thereto upon movement of the plunger in said return direction thereby incrementally extending said first member from said second member to effect adjustment of said one shoe;

said second member having a flange with ratchet teeth projecting therefrom circumscribing said second member;

said drive means engaging said teeth; said resilient means being effective upon temporary locking of said members against relative rotation to absorb said rotational force.

2. The invention of claim 1, said first and second members being coaxial, said resilient means being a circular spring concentric with said members.

3. The invention of claim 2, said drive means being a pawl extending from said spring to engage said teeth.